United States Patent
Li et al.

(10) Patent No.: US 8,244,871 B2
(45) Date of Patent: Aug. 14, 2012

(54) MOBILE COMMUNICATIONS DEVICE CAPABLE OF REPLYING TO ADVERTISING MESSAGE AND METHOD THEREOF

(75) Inventors: Xiao-Guang Li, Shenzhen (CN); Kuan-Hong Hsieh, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 410 days.

(21) Appl. No.: 12/346,867

(22) Filed: Dec. 31, 2008

(65) Prior Publication Data
US 2010/0041421 A1 Feb. 18, 2010

(30) Foreign Application Priority Data
Aug. 12, 2008 (CN) .......................... 2008 1 0303696

(51) Int. Cl.
*G06F 15/173* (2006.01)
(52) U.S. Cl. ........................................ 709/226; 455/466
(58) Field of Classification Search .................. 709/226; 455/466
See application file for complete search history.

(56) References Cited

U.S. PATENT DOCUMENTS

| 7,089,024 | B2 * | 8/2006 | Kim et al. ...................... 455/466 |
| 2008/0097836 | A1 * | 4/2008 | Silanto et al. .................... 705/14 |
| 2008/0101370 | A1 * | 5/2008 | Marsico et al. ................ 370/392 |
| 2008/0147493 | A1 * | 6/2008 | Aarnio et al. .................... 705/14 |
| 2008/0305815 | A1 * | 12/2008 | McDonough ................. 455/466 |
| 2009/0176518 | A1 * | 7/2009 | Doni .............................. 455/466 |
| 2009/0203359 | A1 * | 8/2009 | Makhoul et al. ........... 455/412.2 |

FOREIGN PATENT DOCUMENTS
CN 101043674 9/2007
* cited by examiner

*Primary Examiner* — Thomas Dailey
(74) *Attorney, Agent, or Firm* — Altis Law Group, Inc.

(57) ABSTRACT

A mobile communications device and a method for replying advertising message (ad) are provided. The method includes steps of: receiving an ad transmitted by the server; identifying whether the received ad is messages with a predetermined format; invoking a decoding program from a storage unit for decoding the received ad if the received ad is messages with the predetermined format; identifying the special identifiers to retrieve each part of the ad; displaying a basic content part and a reply content part of the ad after the ad has decoded; identifying the reply code the user inputs in code input area via the input unit; receiving a user's reply, generating a reply message includes a reply code corresponding to the user's reply, and sending the reply message.

5 Claims, 8 Drawing Sheets

FIG. 1

| The Basic Content | |
|---|---|
| Calling Number | …………………… |
| Advertising Title | …………………… |
| Advertising Content | …………………… |
| The Reply Content | |
| **(11) | By………… |
| ***(123) | By………… |
| *(1) | By………… |
| . | …………,……… |
| . | …………,……… |
| . | ………….……… |

FIG. 2

| The Basic Content ||
|---|---|
| Calling Number | 10086 |
| Advertising Title | Present mobile fee |
| Advertising Content | Hello! customer……  |
| The Reply Content ||
| <u>1*(11)</u> | I want to take part in ... |
| <u>***(123)</u> | I want to custom... ... |
| <u>*(1)</u> | I want to custom... ... |
| . . | ……………… ……………… |

FIG. 3

The basic content#
BNum········Enum---
BTitle········ETitle---
BText········EText---
The reply part#
**Rtype11 Rcont··············---
**Rtype12 Rcont··············---

10086
Present mobile fee
Hello! customer
,china mobile have made an
activity………

………………

1*(11)： I want to take
part
***(123)： I want to
custom……
*(1)： I want to
custom……
.    ……
.    ……

MOBILE COMMUNICATIONS DEVICE CAPABLE OF REPLYING TO ADVERTISING MESSAGE AND METHOD THEREOF

BACKGROUND

1. Technical Field

The present disclosure relates to a mobile communications device able to reply to advertising messages and a method thereof.

2. Description of Related Art

In general, the content of an advertising message includes two parts: a basic content part, and a reply content part. The basic content part provides the ad. The reply content part provides one or more replies a user may choose from, and each of the replies is assigned a reply code.

Corresponding to the replies of the ad includes some processing steps. In general, the mobile communications device first provides a reply option for the user to reply the ad, then provides an editing interface for the user to edit the reply after the user chooses the reply option, and sends out the reply after the user has finished editing the reply. The above reply manner is complex and inconvenient for the user, and wastes resources of the server when feedback is sent in response to the ad.

Therefore, what is needed is a mobile communications device and method which can reply to ads efficiently.

DETAILED DESCRIPTION OF THE EMBODIMENTS

Figure 1:
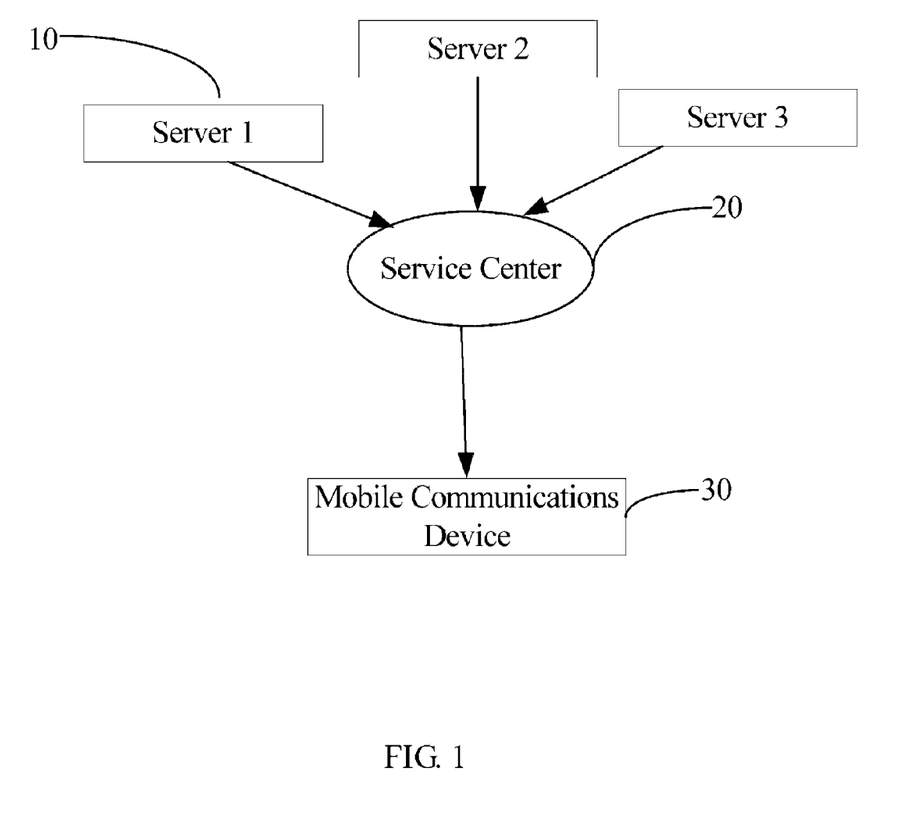
FIG. 1 is a schematic diagram of a system, including a communications device, for receiving and sending ads in accordance with an exemplary embodiment.
Figure 4:
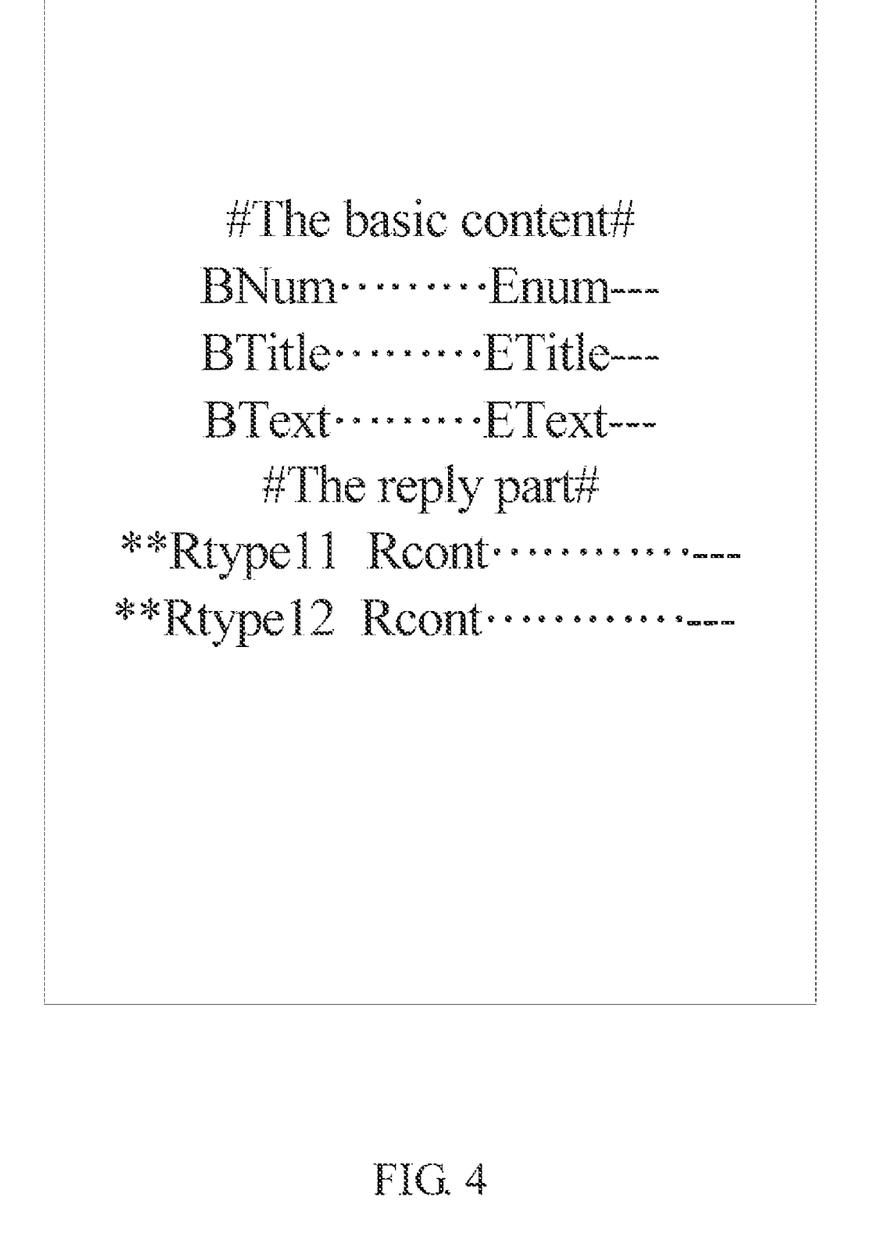
FIG. 4 illustrates an ad in a predetermined format in accordance with an exemplary embodiment.

FIG. 1 is a schematic diagram of a system, including a communications device, for receiving and sending ads in accordance with an exemplary embodiment. The system includes at least one server 10, a service center 20, and at least one mobile communications device 30. The server 10 is configured to generate the ads according to an encoding format such as shown in FIG. 4, and send the ads in a predetermined format to the mobile communications device 30 through the service center 20. Wherein the service center 20 can be Short Messaging Service (SMS), Multimedia Messaging Services (MMS), Enhanced Message Service (EMS), and so on. The mobile communications device 30 decodes the ads with the predetermined format according to a decoding program.

Figure 2:
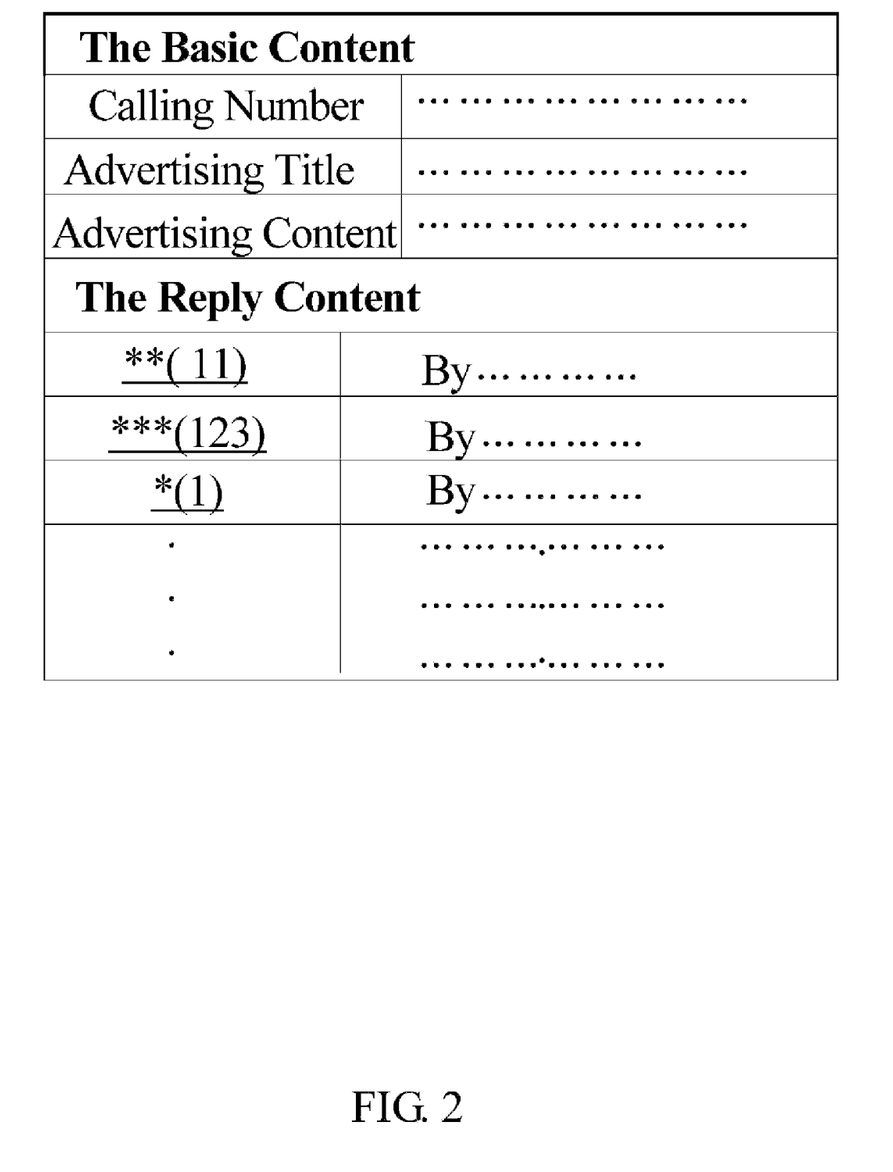
FIG. 2 is an exemplary table of a server of FIG. 1 for associating content with two parts of an ad in accordance with an exemplary embodiment.
Figure 3:
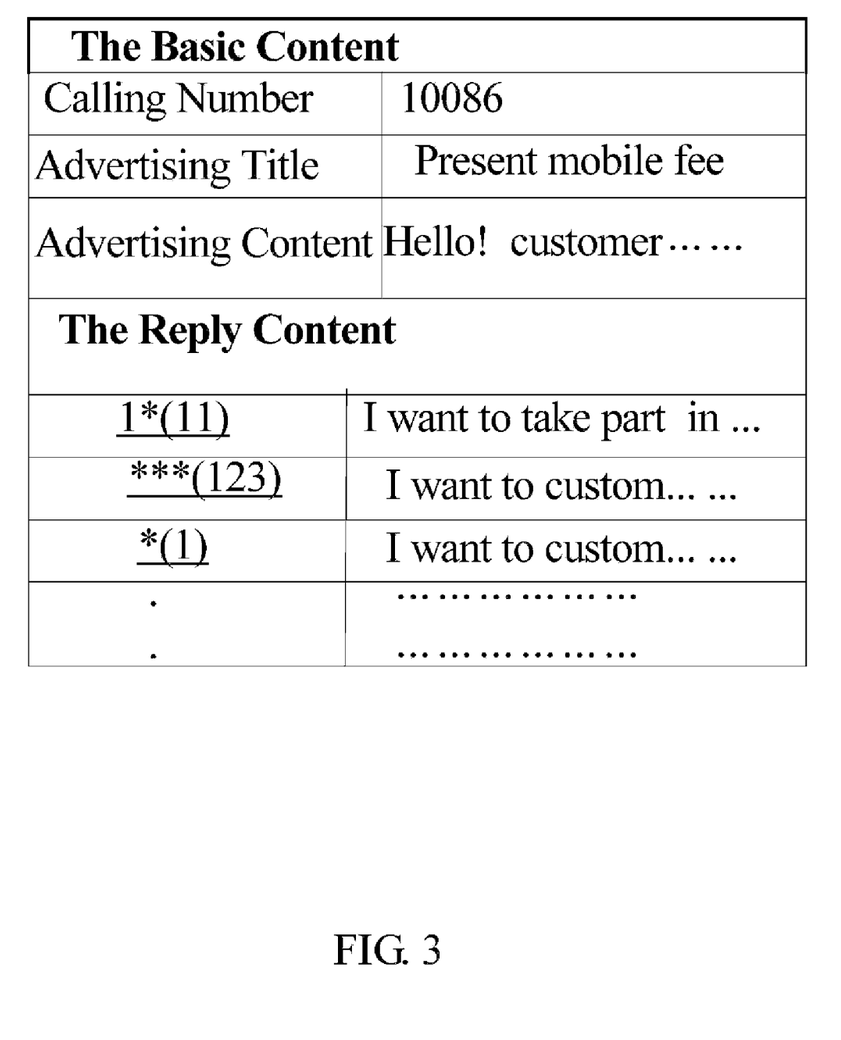
FIG. 3 is a schematic diagram showing an exemplary ad in accordance with an exemplary embodiment.

FIGS. 2 and 3 are exemplary tables of the server 10 for associating content with two parts of an ad in accordance with exemplary embodiments. The ad in the predetermined format includes two parts: a basic content part, and a reply content part. The basic content part is basic information the sender wants to display by the receiving mobile communications device 30, such as, but not limited to, the calling number of the server 10, the ad title, and the content. The reply content part includes a plurality of replies for the user to choose from. Each reply is encoded, and assigned a code input area for easy input, and a reply code for easy identification by the server 10. Where the code input area of the reply content part is indicated by one or more special characters. For example, as shown in FIGS. 2 and 3, the code input area is an area where asterisks are displayed. Furthermore, the mobile communications device 30 provides a movable cursor (not shown) in the code input area for marking the position at which the reply code can be entered. Based on the cursor, the user can input the corresponding reply code in the code input area. For better understanding the ad, an exemplary ad is illustrated in FIG. 3. Basic information provided by the basic content part of the ad may be as follows: the calling number is "10086", the advertising title is "present mobile fee", the advertising content is "Hello, customer . . . "; replies provided in the reply content part of the ad may be: "Yes, I want to take part in the activity" if the user inputs "11," in the code input area via the removable cursor, "Yes, I want to custom . . . " if the user inputs "123," in the code input area via the removable cursor, "Yes, I want to custom . . . " if the user inputs "1," in the code input area via the removable cursor, and so on.

FIG. 4 is a schematic diagram showing an ad encoding format. The encoding format defines an encoding rule and a plurality of encoding identifiers. The encoding rule defines an encoding order of the two parts of the ad (i.e., the basic content part, and the reply content part). For example, in the exemplary embodiment, the encoding order of the two parts is: first encoding the basic content part, and second, encoding the reply content part. The encoding order further defines a sub encoding order for each part. For example, in the exemplary embodiment, the sub encoding order for the basic content part is, first, encoding the calling number, second, encoding the title, and last, encoding the text.

The encoding identifier is configured to identify the two parts of the ad. That is, each part is assigned with two identifiers, for example, such as "#". Based on the encoding order and the identifiers, each part of the ad can be identified. For example, in the exemplary embodiment, when the first two identifiers are identified, the basic content part is identified; and when the second two identifiers are identified, the reply content part is identified.

Furthermore, the encoding format further defines a plurality of sub encoding identifiers to identify the content of each part. For example, in the exemplary embodiment, each part of the basic content part are assigned a first sub identifier for indicating the beginning of the corresponding part and a second sub identifier for indicating the ending of the corresponding part. The first sub identifier as well as the second sub identifier can be in a form of a particular character combined with an abbreviation of the part. For example, the first sub identifier of the calling number can be in the form of "BNum", and the second sub identifier of the calling number can be in the form of "ENum". Detailed description on the sub identifiers of the content of the three parts are shown in FIG. 4.

Figure 5:
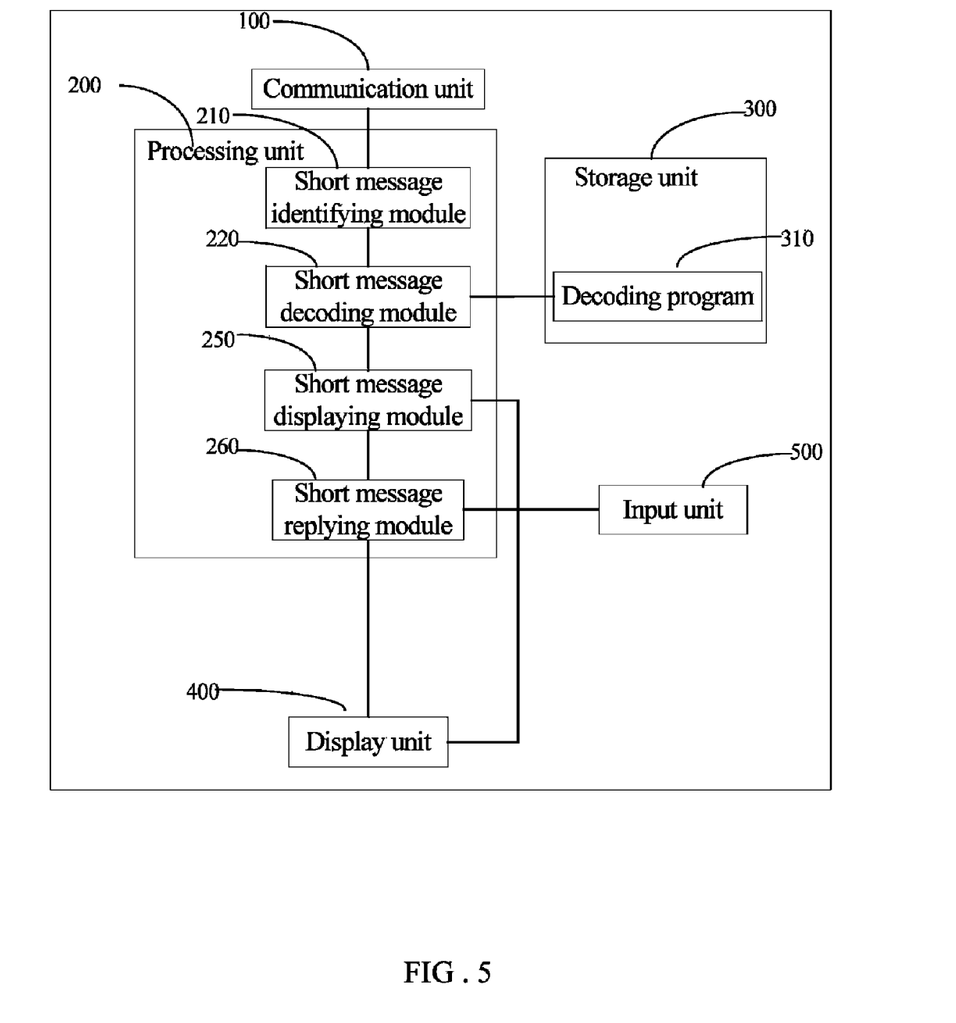
FIG. 5 is a block diagram of a hardware infrastructure of the mobile communications device of FIG. 1 in accordance with an exemplary embodiment.

FIG. 5 is a block diagram of a hardware infrastructure of the mobile communications device of FIG. 1 in accordance with an exemplary embodiment. The mobile communications device 30 includes a communication unit 100, a processing unit 200, a storage unit 300, a display unit 400, and an input unit 500. The storage unit 300 is configured to store a decoding program 310. The decoding program 310 is configured to decode the ad in a predetermined format. The communication unit 100 is configured to receive the ad from the server 10, and store the received ad in the storage unit 300 via the processing unit 200. In general, the received ad is either in a general format or in a predetermined format. If the received ad is in the general format, the processing unit 200 processes the ad with a general manner. In the exemplary embodiment, the general manner includes, but not limited to, deleting message, replying message, forwarding message, and so on. The input unit 500 is configured to input the reply code in the code input area according to the reply content part of the ad. The input unit 500 can be a keyboard, a touch screen, or a combination of a keyboard and a touch screen.

The processing unit 200 includes a short message identifying module 210, a short message decoding module 220, a short message displaying module 250, and a short message replying module 260.

The short message identifying module 210 is configured to identify whether the received ad is a message in the predetermined format. For example, in the exemplary embodiment, the server 10 sets a special suffix name for the ad in the predetermined format, the short message identifying module 210 identifies whether the suffix name of the received ad is consistent with the special suffix name set by the server 10. If the suffix name of the received ad is consistent with the special suffix name set by the server, the short message identifying module 210 determines that the received ad is the ad in the predetermined format.

In another exemplary embodiment, the server 10 sets a special header identifier for the ad in the predetermined format, the short message identifying module 210 identifies whether the header identifier of the received ad is consistent with the special header identifier set by the server. If the header identifier of the received ad is consistent with the special header identifier that the server 10 sets, the short message identifying module 210 determines that the received ad is the ad in the predetermined format.

Figure 7:
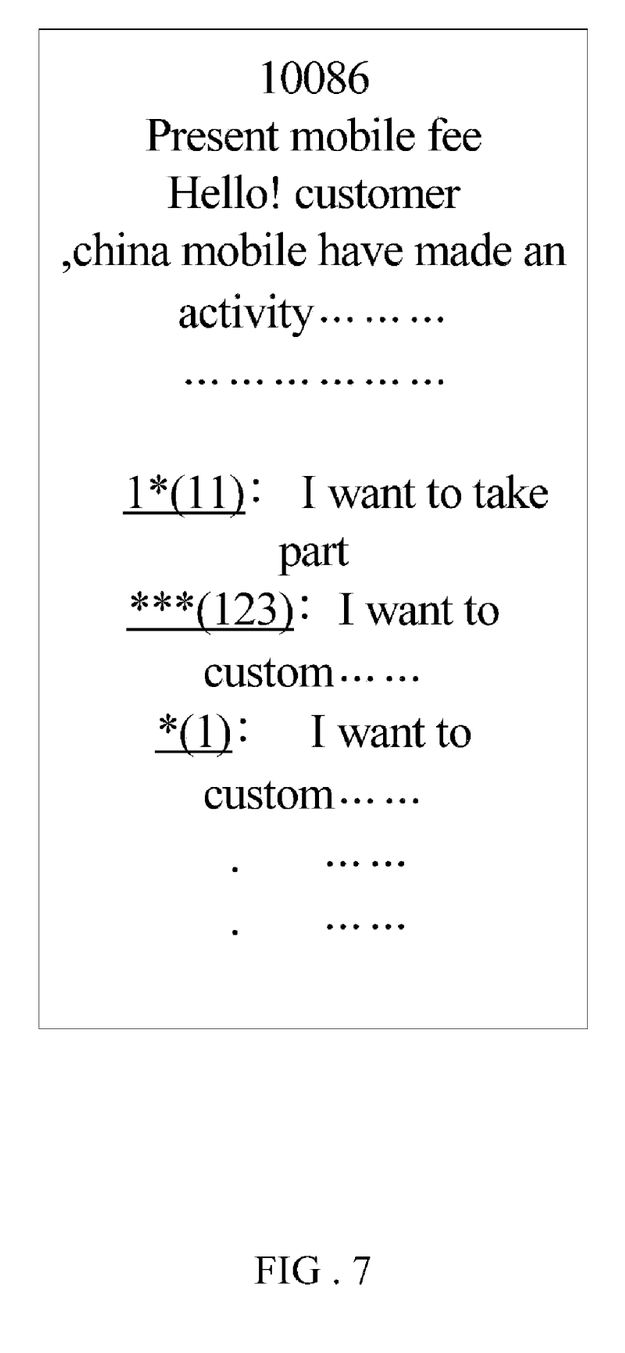
FIG. 7 is a schematic diagram showing an ad received by and displayed on the mobile communications device of FIG. 5 or FIG. 6, in accordance with an exemplary embodiment.

The short message decoding module 220 is configured to invoke the decoding program 310 from the storage unit 300, and identify each part of the ad in the predetermined format according to the deciding program 310. The short message displaying module 250 is configured to display the basic content part and the reply content part via the display unit 400 after the short message decoding module 220 has decoded the ad as shown in FIG. 7. Simultaneously, in order to let the user know where the code input area is, the movable cursor is placed in a predetermined part of the code input area, thereby the short message displaying module 250 displays the code input area and the movable cursor in a predetermined displaying mode. The predetermined displaying mode is different from the displaying mode of the rest area of the reply content part. For example, in the exemplary embodiment, the short message displaying module 230 can display the rest area of the reply content part in the different color, or the different character, and so on.

The short message replying module 260 is configured to receive a user's reply from the input unit 500, generate a reply message which includes the reply code corresponding to the user's reply, and send the reply message to the server 10.

Corresponding to each of the replies for the user to choose from, the mobile communications device 30 provides two reply manners to reply the ad. Each of the reply manners defines processing steps to reply the ad by the user. For example, regarding the first reply manner, the mobile communications device 30 first provides a reply option for the user to reply to the ad, then provides an editing interface for the user to edit the reply after the user chooses the reply option, and sends the reply to the server 10 when the user finishes editing the reply. Regarding the second reply manner, the mobile communications device 30 automatically generates a reply message in response to the reply code input by the user in the code input area, and sends the generated reply message to the server 10.

Figure 6:
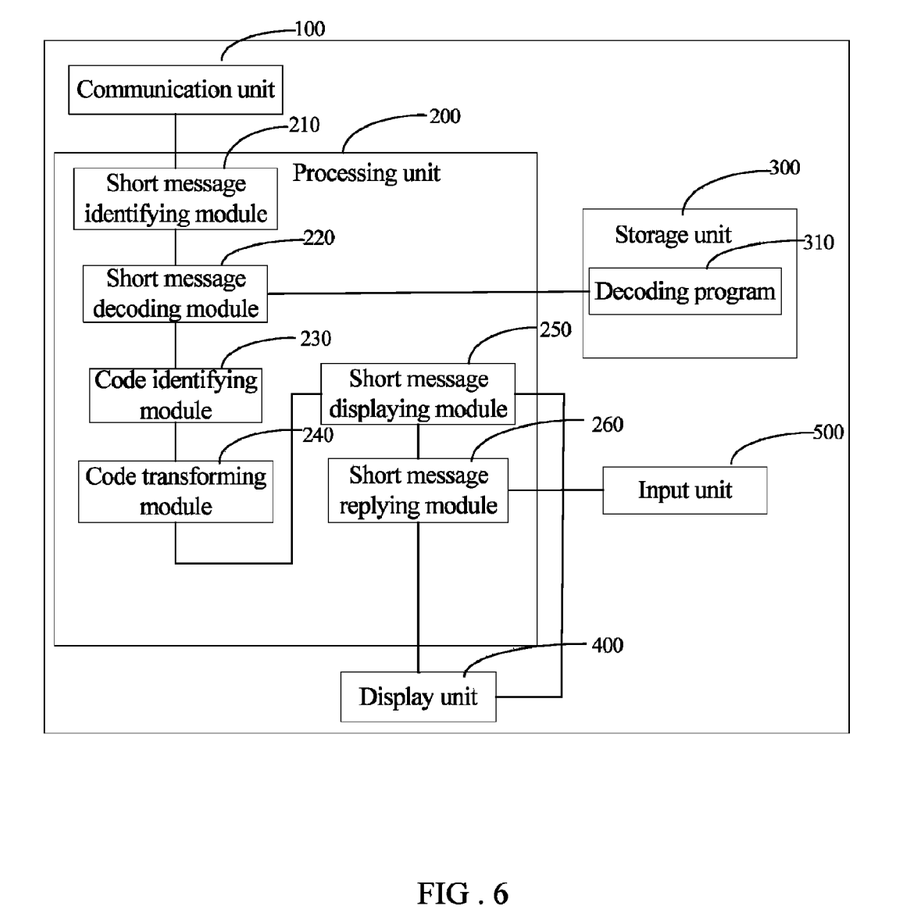
FIG. 6 is another block diagram of a hardware infrastructure of the mobile communications device of FIG. 1 in accordance with an exemplary embodiment.

In another exemplary embodiment as shown in FIG. 6, the processing unit 200 further includes a code identifying module 230 and a code transforming module 240. The code identifying module 230 is configured to identify whether the reply code is a complex reply code. In the exemplary embodiment, the complex reply code is one whose byte length is greater than a predetermined byte length.

The code transforming module 240 is configured to transform the complex reply code to a predetermined simple user input code. For example, if the reply code of the ad is "abcdeuf," "dabudcf," or "poldenv,", the code identifying module 230 identifies this reply code as a complex reply codes, the code transforming module 240 transforms the complex reply code into a predetermined simple user input code, e.g., "11," "22," or "33," respectively. The short message displaying module 250 displays the predetermined simple user input code in the reply content part of the ad after the code transforming module 240 transforms the complex reply code to the predetermined simple user input code. Accordingly, it is easy and convenient for the user to make a reply for the ad according to the predetermined simple user input code. The code transforming module 240 further transforms the reply code to the corresponding complex reply code, and the short message replying module 260 sends the corresponding complex reply code to the server 10, after the user selects a reply to the ad. Wherein the reply code is the predetermined simple user input code transformed form the corresponding complex reply code by the code transforming module 240.

Figure 8:
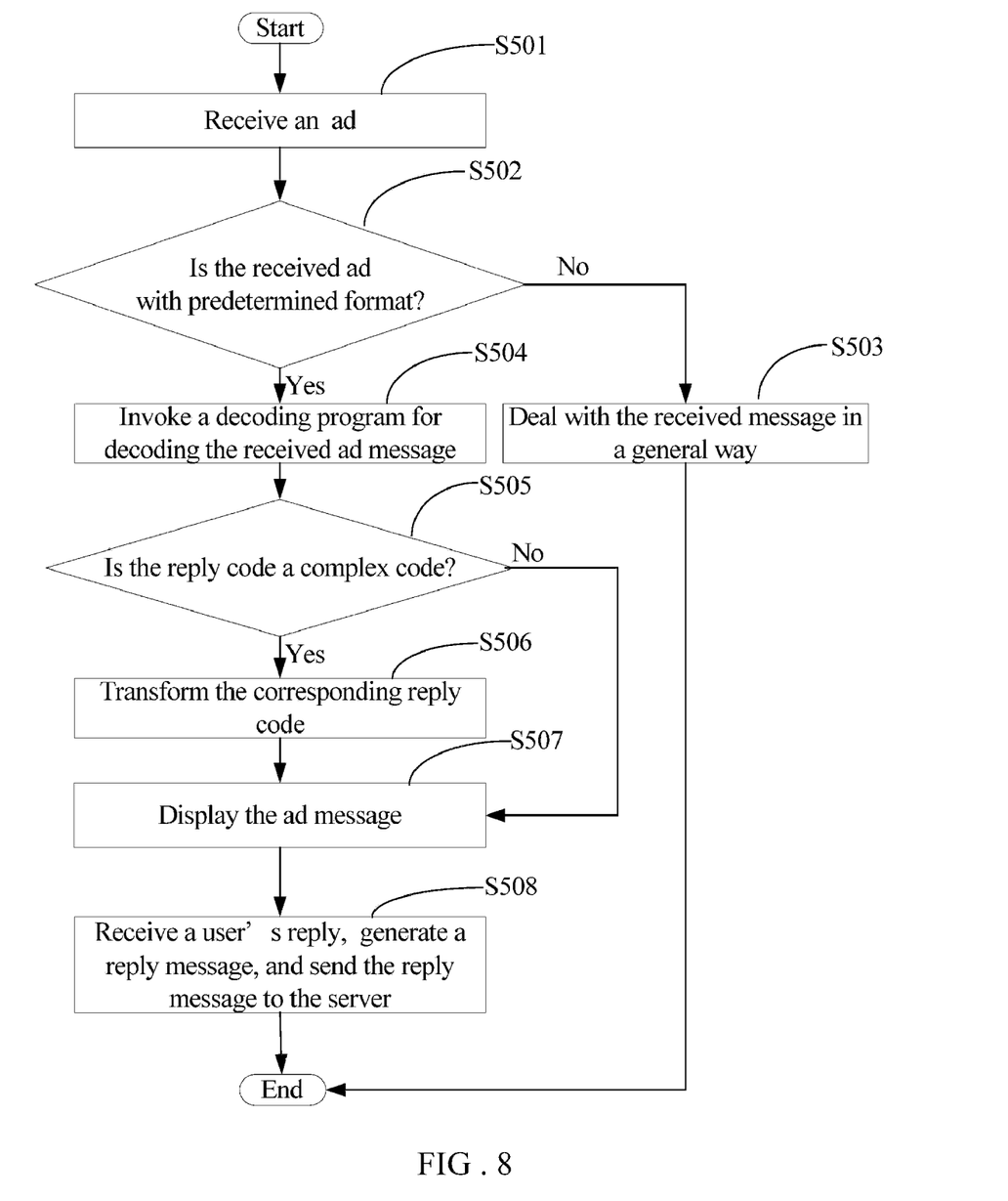
FIG. 8 is a flowchart of an ad reply method implemented by the mobile communications device of FIG. 6 in accordance with an exemplary embodiment.

FIG. 8 is a flowchart of an ad reply method implemented by the mobile communications device of FIG. 6 in accordance with an exemplary embodiment.

In step S501, the communication unit 100 receives an ad transmitted by the server 10.

In step S502, the short message identifying module 210 identifies whether the received ad is a message in the predetermined format.

In step S503, the user deals with the ad in a general manner if the received ad is in the general format.

In step S504, the short message decoding module 220 invokes a decoding program 310 from the storage unit 300 for decoding the ad if the ad is a message in the predetermined format.

In step S505, the code identifying module 230 identifies whether the reply code of the ad is a complex reply code. That is, the code identifying module 230 determines whether the byte length of the reply code is greater than a predetermined byte length. If the reply code is not the complex reply code, the procedure goes to step S507.

If the reply code is the complex reply code, in step S506, the code transforming module 240 transforms the complex reply code into the predetermined simply user input code.

In step S507, the short message displaying module 250 displays the basic content part and the reply content part of the ad on the display unit 400.

In step S508, the short message replying module 260 receives a user's reply, generates a reply message which includes a reply code corresponding to the user's reply, and sends the reply message to the server 10.

Although the present invention has been specifically described on the basis of the exemplary embodiment thereof, the invention is not to be construed as being limited thereto. Various changes or modifications may be made to the embodiment without departing from the scope and spirit of the invention.

What is claimed is:

1. A mobile communications device capable for replying to the advertising message (ad), comprising:
    a communication unit capable of receiving the ad from a server, wherein the received ad is either in a general format or in a predetermined format; the ad in the predetermined format comprises a basic content part and a reply content part, the reply content part includes a plurality of replies for a user to choose from, each reply is encoded and assigned a code input area, and a reply code for the user to input in the code input area to reply the ad, and each part of the ad is assigned an identifier for identification; the code input area comprises a movable cursor for marking the position at which the reply code can be entered;
    a storage unit capable of storing the received ad and a decoding program for decoding the ad according to the decoding program;
    a display unit;
    an input unit; and
    a processing unit comprising:
        a short message identifying module capable of identifying whether the received ad is a message in the predetermined format;
        a short message decoding module capable of invoking the decoding program from the storage unit for decoding the ad, and identifying the assigned identifiers of the ad to retrieve each part of the ad in the predetermined format;
        a short message displaying module capable of displaying the basic content part and the reply content part in a displaying mode on the display unit;
        a short message replying module capable of receiving the reply code from the input unit in the code input area associated with the received reply code, generating a reply message which includes the received reply code, and sending the reply message;
        a code identifying module capable of comparing a byte length of the reply code with a predetermined byte length to identify whether the reply code is in a complex reply code type, wherein the reply code in the complex code type is one whose byte length is greater than the predetermined byte length; and
        a code transforming module capable of transforming the reply code in the complex reply code type into only one reply code in a predetermined simple reply code type whose byte length is less than the predetermined byte length and which is different from any part of the reply code in the complex reply code type, and further capable of transforming the only one reply code in the predetermined simple reply code type into the corresponding reply code in the complex reply code type after the user inputs the reply code in the predetermined simple reply code type for the ad.

2. The mobile communications device as in claim 1, wherein the short message displaying module displays the code input area and the cursor in a predetermined displaying mode via the display unit, the predetermined displaying mode is different from the displaying mode of a rest area of the reply content part.

3. The mobile communications device as in claim 1, wherein the input unit is selected from the group consisting of a keyboard, a touch screen, and a combination of a keyboard and a touch screen.

4. An advertising message (ad) replying method comprising:
    receiving an ad from a server, wherein the received ad is either in a general format or in a predetermined format, and the ad in the predetermined format comprises a basic content part and a reply content part, the reply content part comprises a plurality of replies for a user to choose from, each reply is encoded and assigned a code input area, and a reply code for the user to input in the code input area to reply the ad, each of the ad is assigned an identifier for identification, the code input area comprises a movable cursor for marking the position at which the reply code can be entered;
    identifying whether the received ad is a message in the predetermined format;
    decoding the ad via a decoding program, and identifying the assigned identifiers of the ad to retrieve each part of the ad if the ad is in the predetermined format;
    displaying the basic content part and the reply content part in a displaying mode on the display unit, wherein the attribute of the code input area of the reply content part is writable, the code input area comprises a removable cursor which has used to determine a input position; and
    receiving the reply code, generating a reply message which includes the received reply code, and sending the reply message;
    comparing a byte length of the reply code with a predetermined byte length to identify whether the reply code is in a complex reply code type, wherein the reply code in the complex code type is one whose byte length is greater than the predetermined byte length;
    transforming the reply code in the complex reply code type into only one reply code in a predetermined simple reply code type whose byte length is less than the predetermined byte length and which is different from any part of the reply code in the complex reply code type; and
    transforming the only one reply code in the predetermined simple reply code type into the corresponding reply code in the complex reply code type after the user inputs the reply code in the predetermined simple reply code type for the ad.

5. The method as described in claim 4, further comprising:
    displaying the code input area and the cursor in a predetermined displaying mode, wherein the predetermined displaying mode is different from the displaying mode of a rest area of the reply content part.

* * * * *